June 1, 1965  H. J. ZIMMERMANN  3,186,141
APPARATUS FOR PRODUCTION OF TAPES HAVING SPACED PACKAGE POCKETS
Filed June 1, 1961  6 Sheets-Sheet 6

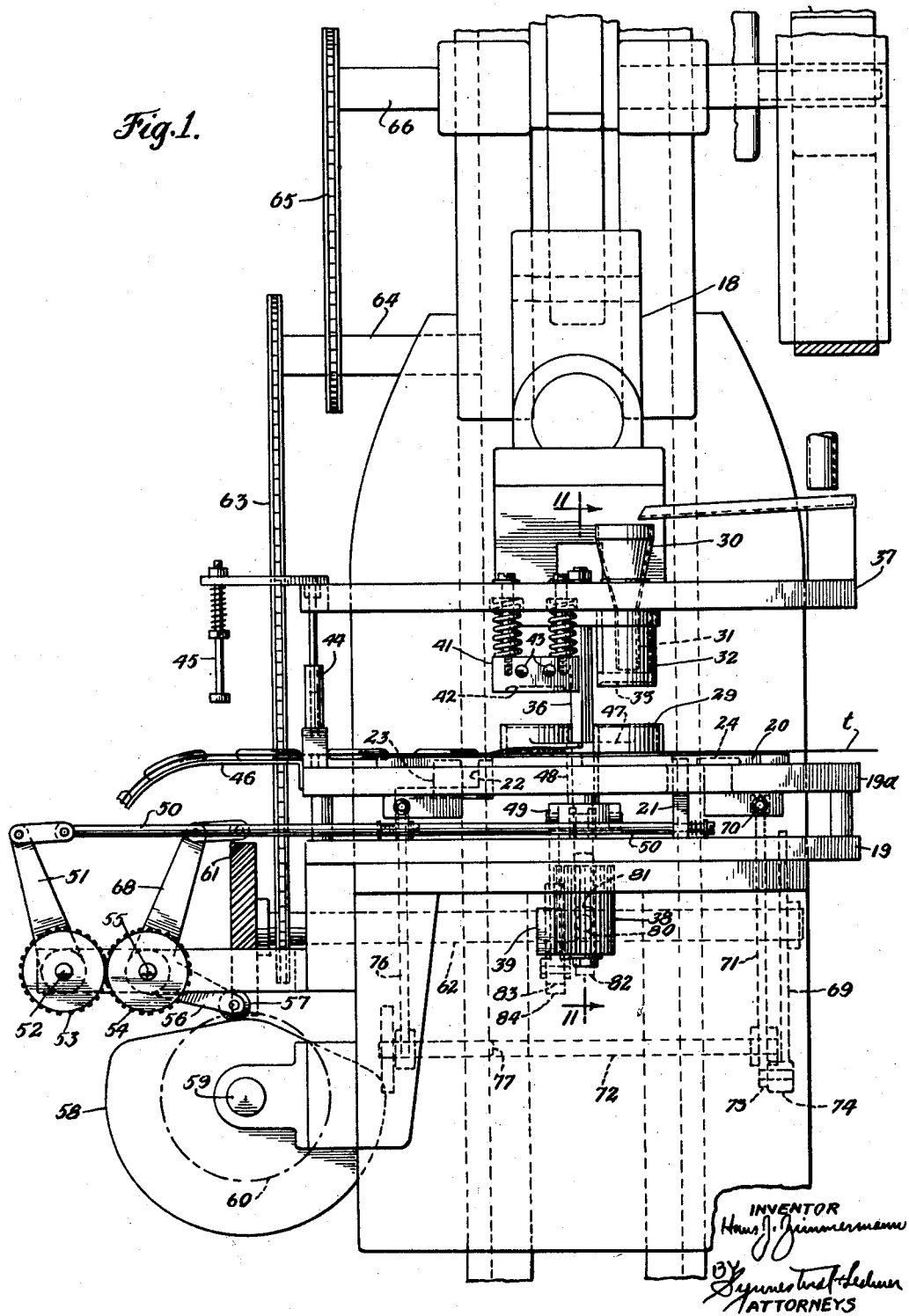

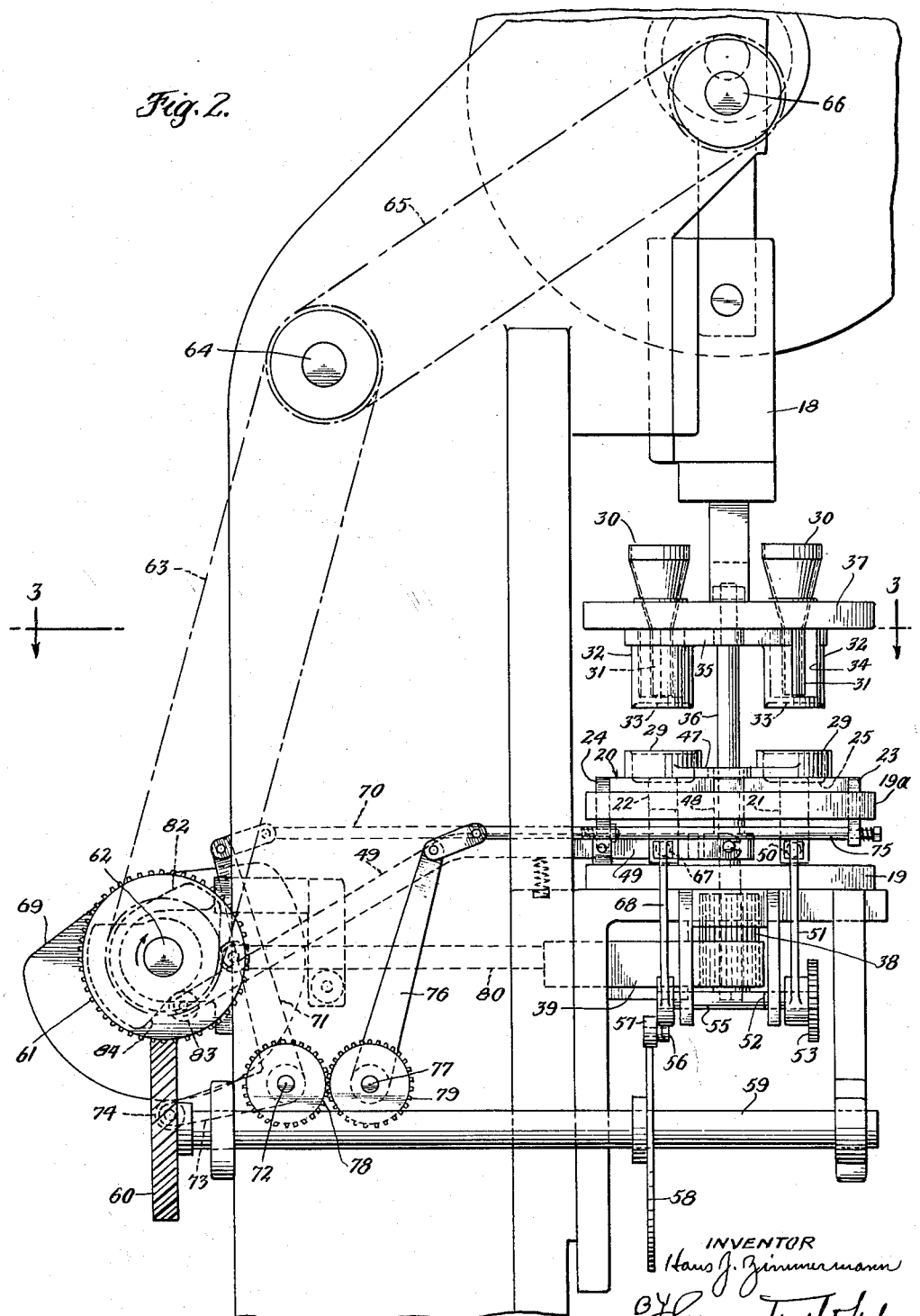

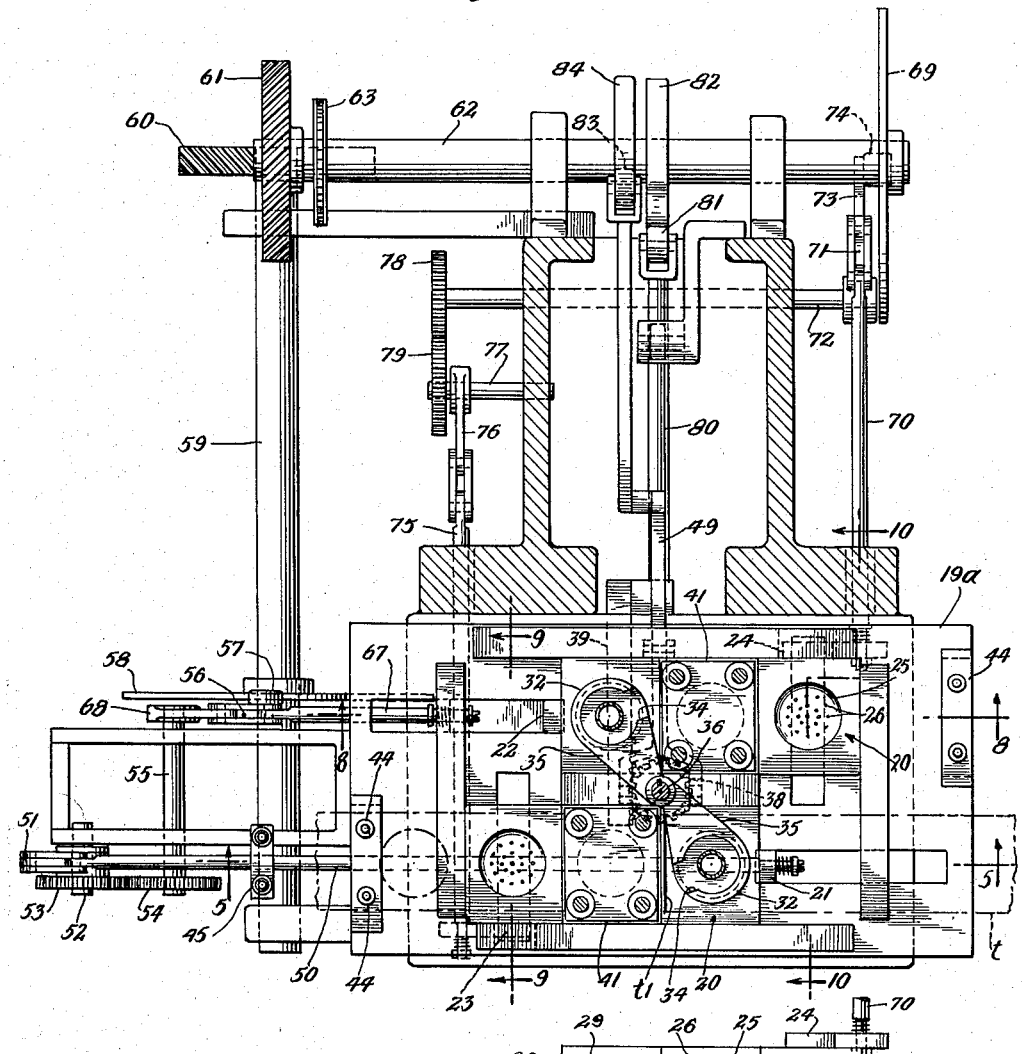

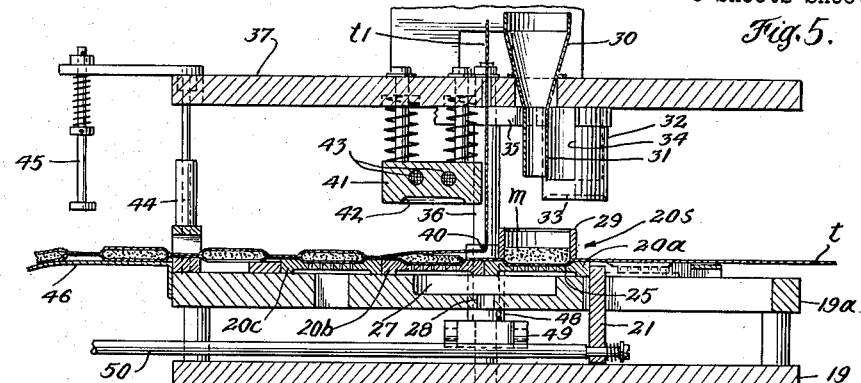
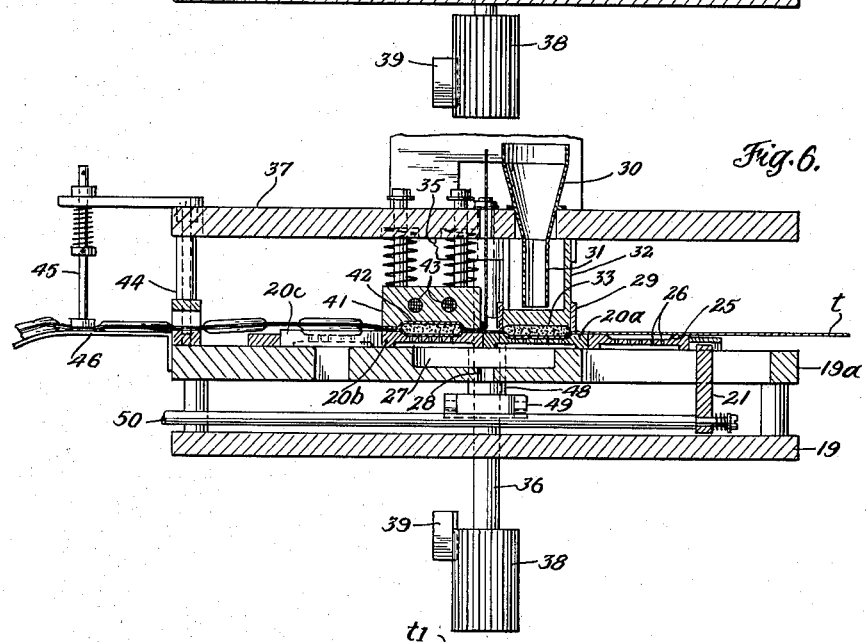
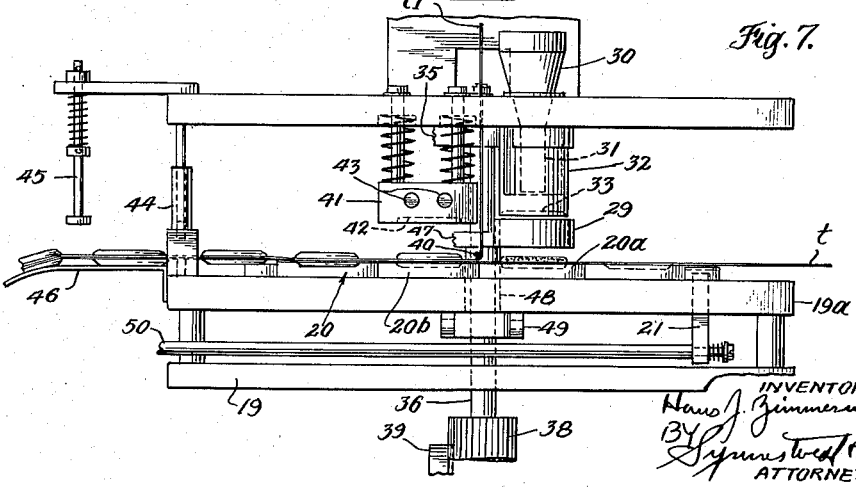

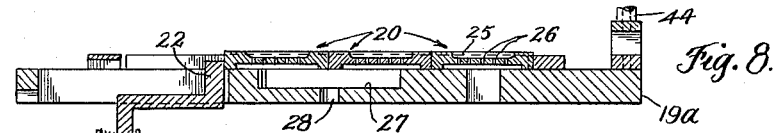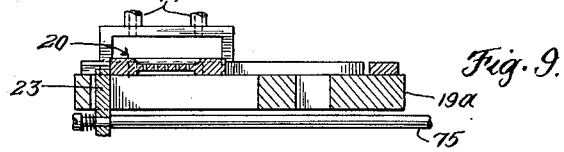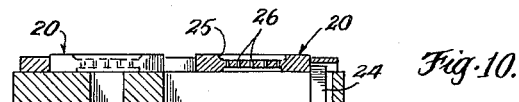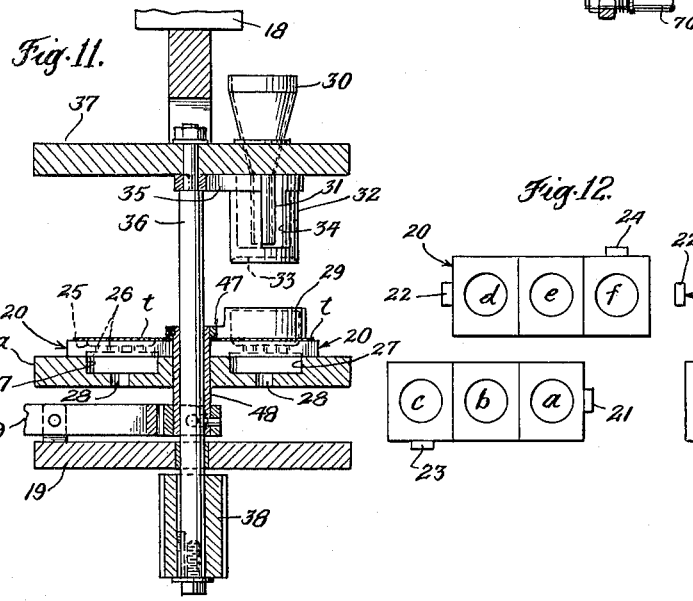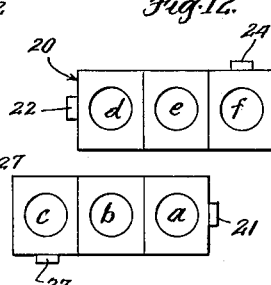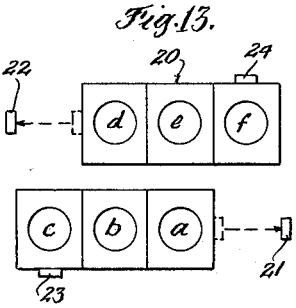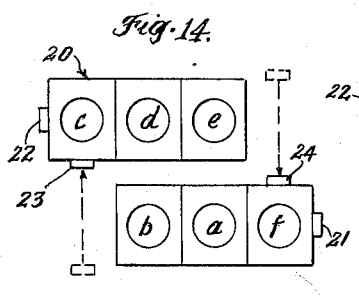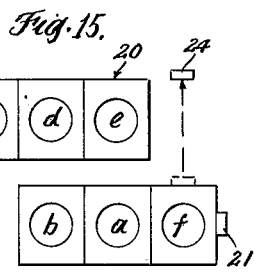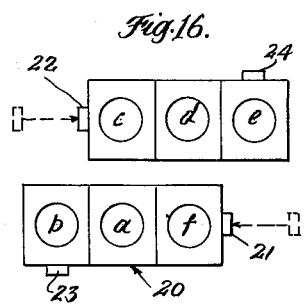

INVENTOR
Hans J. Zimmermann
BY
ATTORNEYS

United States Patent Office 3,186,141
Patented June 1, 1965

3,186,141
APPARATUS FOR PRODUCTION OF TAPES HAVING SPACED PACKAGE POCKETS
Hans J. Zimmermann, Philadelphia, Pa., assignor to Rudd-Melikian, Inc., Hatboro, Pa., a corporation of Pennsylvania
Filed June 1, 1961, Ser. No. 114,246
8 Claims. (Cl. 53—184)

This invention relates to the packaging of materials, and is particularly concerned with packaging of the type in which package pockets are formed between a pair of tape strips, the material to be packaged being fed to such pockets and the pockets being closed by sealing the tape strips to each other in regions surrounding the pockets. The invention is particularly adapted to the production of package tape of indefinite length having spaced package pockets containing the material to be packaged.

Although many features of the invention are of general applicability in the packaging of a wide variety of materials, certain features are especially adapted to the packaging of granular or powdered materials, for instance granular or powdered coffee, and while the invention is of broader applicability, the invention is herein illustrated and described with particular reference to a machine or apparatus for the packaging of granular or powdered coffee.

In apparatus of the general character referred to, tape supporting or tape forming means or devices are employed, for instance for the purpose of forming indentations or pockets in the tape to receive the material to be packaged, and to seal the tape strips together around the pockets. Moreover, in this kind of apparatus the tape supporting or forming devices are usually advanced or moved through a plurality of operating stations corresponding, for example, to pocket forming, pocket loading, and pocket sealing.

One of the principal objects of the present invention is to arrange equipment or apparatus of the general character referred to above in such a manner as to provide for the movement of the tape supporting or tape forming devices in a closed circuit having two oppositely moving runs which are preferably arranged to lie in a common horizontal plane. With this arrangement, it becomes possible to make use of the tape supporting or tape forming devices during their travel in each of the two oppositely moving runs. This double use of the same parts enables greater output capacity for a given number of tape supporting or tape forming devices.

With the foregoing in mind, the apparatus of the present invention preferably comprises a multiplicity of tape supporting plates, each of which is provided with a pocket-forming cavity in its upper face, and all of these plates are arranged in a common horizontal plane and mounted for shifting movement through a closed circuit having two oppositely moving horizontal runs. When arranged in this manner, including the horizontal disposition of the two oppositely moving runs, the invention achieves a further objective of enabling the double use of the forming plates while at the same time relying upon gravity for retaining the material to be packaged on the tape strips fed through the machine.

According to the invention the machine further includes mechanisms for producing dimples in the tape strips to form package pockets, mechanisms for feeding measured charges of the material to be packaged to the pockets, mechanism for briquetting powdered material in the pockets, mechanism for feeding a second tape strip over the first, and mechanism for sealing the charged pockets. The invention provides simple and effective operating or actuating means for various mechanisms such as those just mentioned.

According to another aspect of the invention, various of the mechanisms, including the briquetting mechanisms, and the sealing mechanisms for both of the runs of the tape supporting or forming devices are mounted in common for conjoint or simultaneous movement by a single operating mechanism, for instance operating mechanism including a ram crank type of structure.

In another aspect, the invention contemplates the use of a series of tape supporting plates or devices, each of which is a separate device, rather than being interconnected as in a conveyor chain or the like. These separate tape supporting plates are shifted through various positions of a closed circuit, in which positions the various packaging operations are performed. The invention, moreover, provides shifter mechanism for the separate plates and the shifter mechanism is arranged to simplify the manner of accurately indexing the positions of the plates, so that the various operating mechanisms will accurately register with the plates during the successive steps of the packaging operation.

How the foregoing, together with other objects and advantages, are obtained will appear more fully from the following description referring to the accompanying drawings which illustrate a preferred embodiment of apparatus constructed according to the invention and adapted particularly to the packaging, in tape form, of granular or powdered coffee. Such "coffee tapes" are adapted for use in coffee dispensing machines in which a fresh cup of coffee is brewed from each of the pockets or pods of coffee carried by the tape.

In the drawings—

FIGURE 1 is a front elevational view of the machine with the ram crank in its uppermost position, hereinafter referred to as the 0° position;

FIGURE 2 is a side elevational view looking at the left side of FIGURE 1, with the heat sealing mechanisms omitted;

FIGURE 3 is a plan section on the line 3—3 of FIGURE 2;

FIGURE 4 is a more or less diagrammatic view showing the tape supporting or forming devices and also illustrating certain mechanisms provided for retaining material delivered to the tape in proper position during briquetting;

Figure 17:
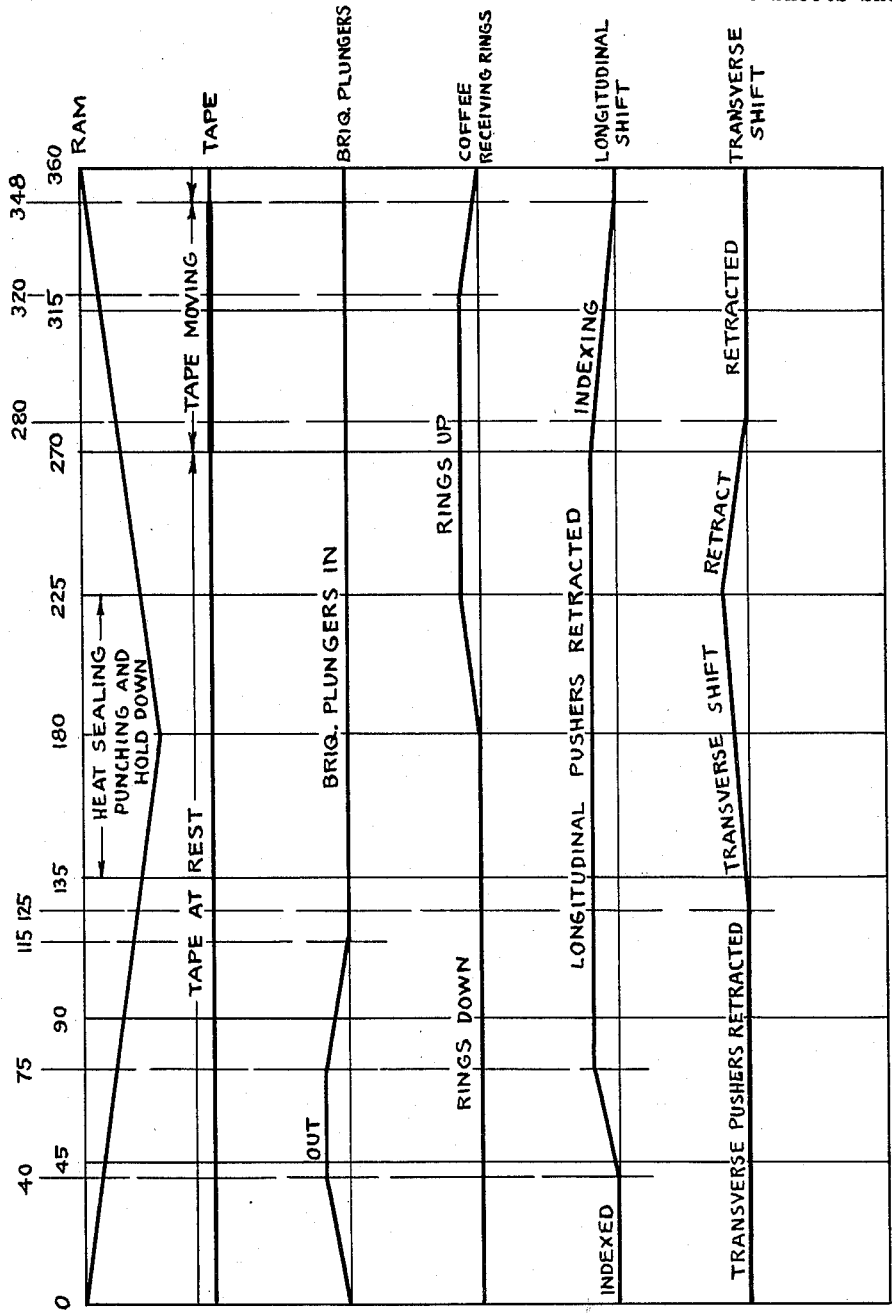

FIGURE 5 is a vertical sectional view taken on the line 5—5 of FIGURE 3 showing the position of the parts after the ram crank has rotated 40° in a clockwise direction from the top or 0° position of FIGURES 1 and 2;

FIGURE 6 is a vertical section similar to FIGURE 5 but showing the position of the parts after the ram crank has rotated 180° from the top or 0° position of FIGURES 1 and 2;

FIGURE 7 is an elevational view showing the position of the parts after the ram crank has rotated 270° from the top or 0° position of FIGURES 1 and 2;

FIGURE 8 is a horizontal section on the line 8—8 of FIGURE 3 and shows the tape supporting devices or plates, one of the plate pusher mechanisms, and a mechanism for providing an indexing marking on one of the two tapes being produced by the machine;

FIGURE 9 is a cross sectional view of certain details taken on the line 9—9 of FIGURE 3;

FIGURE 10 is a cross section of certain details taken on the line 10—10 of FIGURE 3;

FIGURE 11 is a vertical sectional view on the line 11—11 of FIGURE 1, showing the arrangement of certain parts described more fully hereinbelow;

FIGURES 12 to 16 inclusive are diagrammatic views showing the plate shifting sequence; and FIGURE 17 is a chart diagramming the sequence of various operating stages of the apparatus.

The machine illustrated in the drawings is built in association with a press mechanism of standard type including a vertically reciprocable ram 18 on which certain parts are mounted which it is desired to have move vertically at various stages of the operation. Other parts of the mechanism are mounted on the base platen 19 of the press.

According to the present invention the tape supporting or tape forming devices take the form of plates such as shown at 20. As seen particularly in FIGURES 3, 4 and 12 to 16 inclusive, there are six of these plates 20, and they are mounted by means of a supporting plate 19a having various guide devices which permit the plates to be moved in step-by-step fashion through a closed circuit, the nature of which will be clear from the diagrammatic views of FIGURES 12 to 16 inclusive. In these diagrammatic views the plates are identified by the letters *a* to *f* inclusive in certain sequences and in certain of these figures the progression of the plates from one position to another will be apparent.

These diagrammatic figures also diagrammatically illustrate certain pusher mechanisms which are employed to shift the plates from one position to another. The pusher mechanisms include an element 21 adapted to push a series of plates *a*, *b*, and *c* from right to left, as seen in FIGURE 12. A pusher element 22, also shown in FIGURE 12, serves to push the plates *d*, *e*, and *f* from left to right. Pusher element 23 serves to push the last plate in one run (plate *c* of FIGURE 12) from that run (the lower run as there illustrated) into the first position of the other run (see FIGURE 14). The pusher element 24 serves to shift the last plate (*f* in FIGURE 12) of the second run back into the first position of the first run (see FIGURE 15).

Because of the motion of these plates, the pusher elements must be withdrawn in order to remove them from the path of motion of the plates in succeeding shifting movements. The shifting of the plates and the sequence of operations of the shifter mechanisms, as shown in FIGURES 12 to 16 inclusive, proceeds as follows:

As shown in FIGURE 12, the element 21 has pushed plates *a*, *b*, and *c* to the left and element 22 has pushed plates *d*, *e*, and *f* to the right. As seen in FIGURE 13, the pusher element 21 has been withdrawn, as has also the pusher element 22. In FIGURE 14 the transverse pusher elements 23 and 24 have both operated to respectively shift plate *c* from the lower to the upper run (as viewed in the drawing) and plate *f* from the upper to the lower run. In FIGURE 15 the pushers 23 and 24 have again been withdrawn in order to provide clearance for the next shifting movement which is illustrated in FIGURE 16. In FIGURE 16 it will be seen that pusher elements 21 and 22 have again operated to shift the lower series of plates to the left and the upper series to the right, and at this time it will be noted that the pusher elements are in the same position as in FIGURE 12, but that the plates have been advanced one step in the closed circuit through which they all travel in the course of the operation of the machine.

Referring now more particularly to FIGURES 3, 4, 5, and 8, it will be seen that each of the tape supporting plates 20 is of identical construction. Each has a pocket forming cavity in the upper surface thereof as indicated at 25 which is shaped to conform with the contour of the lower half of a pocket or pod to be formed in the tape. In the bottom wall of the cavity there are ports 26 leading through to the lower side of the plates and adapted to communicate with a vacuum passage such as shown at 27 having a duct 28 for communicating with a pressure reducing pump or the like (not shown).

As seen particularly in FIGURES 5, 6, and 8, the vacuum ports 26 of the plates come into registry with the vacuum chamber 27 only in certain positions of the plates.

As seen in FIGURES 1 to 4 inclusive, the two opposite runs of movement of the plates 20 are arranged in the same horizontal planes with the pocket forming cavities presented upwardly. These two runs of the plates may for convenience be referred to as front and rear runs, referring respectively to the lower and upper runs as viewed in FIGURES 3 and 4, as well as in FIGURES 12 to 16 inclusive. As hereinabove briefly mentioned, it is contemplated that forming operations will be performed during both of the opposite runs of the plates, and for this purpose separate tape strips are fed over each of these two runs, the strip for the front run being indicated in dot-and-dash lines in FIGURE 3 by the letter *t*. This strip *t* is of course fed in the direction in which the plates move in the front run, i.e., from right to left. The tape strip to be fed over the rear run of the plates would be fed in the direction from left to right, since that is the direction in which the plates move in the rear run, as explained above in connection with FIGURES 12 to 16.

Referring now specifically to the operations performed in sequence, as the tape passes in the front run of the forming plates, as seen in FIGURE 5, as the plates reach the station indicated at 20*s* in that figure, the tape strip *t* has been drawn into the cavity in that plate by the vacuum action. While the plate 20*a* is at that station a retaining device in the form of a ring 29 is brought into registry with the cavity in the plate in order to position the charge of material to be delivered to the tape at that station. In the apparatus herein described for illustrative purposes, this charged material is assumed to be a charge of granular coffee *m* which is delivered to the tape by means of a delivery funnel 30 having a downwardly open nozzle 31. Preferably, the charge of coffee delivered in this manner constitutes a measured charge derived by metering equipment (not shown) adapted to deliver the charges in sequence to the funnel 30. After the charge has been deposited or delivered to the tape, a briquetting device 32 is shifted to a position in registry with the cavity in the plate 20*a* and the press is actuated to bring the briquetting device downwardly within the ring 29 and against the charge of coffee to compress and briquet the coffee against the cavity wall in the plate 20*a*, the briquetting operation being shown in FIGURE 6.

As seen in FIGURES 5 and 6 the briquetting device is generally of cylindrical form having a solid bottom wall with a cavity at its lower side indicated at 33, this cavity being shaped to conform to the upper half of the pocket or pod being formed. The upright side wall of the cylindrical briquetting device 32 is cut out at one side as indicated at 34 in order to pass the nozzle 31 when the briquetting device swings or shifts into briquetting position. For the purpose of providing appropriate shifting motion between its operative and inoperative position, the briquetting device, see particularly FIGURES 1, 2, 3, and 11, is mounted by means of an oscillating arm 35 which is keyed to an upright shaft 36 which is rotatably mounted in the plate 37 carried by the ram 18 and also in the base or platen plates 19*a* and 19. Below the plate 19 a pinion 38 is keyed to the shaft 36 and this pinion in turn is adapted to be actuated by means of a rack 39 operated in a manner described more fully hereinbelow.

After the briquetting operation has been completed, the press again opens, lifting the briquetting plunger 32 from the tape strip and lifting also the coffee feed funnel 30 and nozzle 31. The retaining ring 29 is then also lifted, as seen in FIGURE 7, in order to clear the coffee tape and the compacted briquet of coffee so as to permit advancement thereof with the plate 20*a* to the next station, which is the central station as indicated in FIGURE 14. However, during the briquetting operation on plate 20*a* when that plate is in the position of FIGURES 5 and 6, a sealing operation is taking place over the plate 20*b* which is beyond the plate 20*a*. This plate is shown in FIGURES 5 and 6 and corresponds to the position *b* indicated in FIGURE 12. To complete the packaging, it is also necessary to feed a second tape strip to the mechanism and this feed comes in at a point intermediate the plates 20*a* and 20b, as shown at t1. The feed point of this second tape strip appears in FIGURES 5 and 6, the tape strip being fed downwardly in the center portion of the equipment just to the left of the coffee supply funnel 30. The tape strip t1 passes under a guide 40 from which the tape passes over the previously formed briquet of coffee on the plate 20b. Upon reaching this station, as shown in FIGURES 5 and 6, a spring loaded heat sealing head 41, which is carried by the plate 37, moves downwardly at the same time the briquetting plunger 32 is brought downwardly, but the heat sealing head 41 cooperates with the plate 20b to effect sealing of the two strips of paper to each other around the briquet of coffee which has previously been compacted on plate 20b. The sealing head has a cavity 42 in the lower face thereof shaped to conform with the upper portion of the pod or pocket and, therefore, the two strips of paper are sealed together all around the pod to thereby complete the packaging of that pod of coffee. The sealing head is provided with electrical heating elements indicated at 43, and the spring or yielding mounting of the sealing head provides for an interval of dwell of the head in contact with the tape strips so as to ensure thorough sealing.

After the next opening of the press, the forming plates are advanced again, the plate 20b being carried to the position indicated by the letter c in the diagram of FIGURE 12, this position of such plate being shown at 20c in FIGURE 5. The loading and compacting operations and also the heat sealing operation described above are then performed upon the following plates in the series, and when the press again opens the plate 20c referred to just above is then shifted into the initial position of the rear run of the closed circuit of movement of the plates. In FIGURE 6, plate 20c appears in elevation, as it is in that figure shifted partway (in a direction into the paper) to the initial position of the rear run. This transverse shifting of the plate 20c results in dislodgment of the pod from the cavity in that plate, as will be seen in FIG. 6, the path of the tape continuing to the left when viewed as in FIGURE 6.

With each stroke of the press, perforating or punch mechanism indicated at 44 (see FIGURES 5 to 7) provides indexing perforations preferably at locations intermediate the pods, such perforations being desirably employed to index the movement of the tape in the coffee dispensing machine in which the tape is used. In FIGURES 5 and 7, the punch part of this mechanism is shown raised, whereas in FIGURE 6, the punch part is shown after having penetrated the tape.

A spring-pressed hold-down device indicated at 45 is also provided beyond the punch mechanism, and this device holds the tape against a plate or guide surface 46, so that upon release of the punch it will not stick in the perforations provided in the tape.

The foregoing description deals with the sequence of operations, and the mechanisms for performing those operations in association with the forming plates 20 during their shifting movement in one (the forward) run of the closed circuit in which the plates are moved. All of these steps and all of the mechanisms for performing those steps, including the coffee loading mechanism, the retaining mechanism, the briquetting mechanism, the sealing mechanism, the punch mechanism, and the hold-down mechanism, are all duplicated in the other (the rear) run of the plates. However, since the plates in the rear run are moving in the opposite direction, the positions of the operating mechanisms are inverted, so that the sequence of these parts progresses from left to right, instead of from right to left, as shown, for example, in FIGURE 5. Certain of the parts associated with the rear run appear in FIGURE 8, including the pusher device 22 and the punch mechanism 44. In FIGURE 9, the punch mechanism 44 also appears, and from this view it will be seen that the punch mechanism for each tape strip being made includes a pair of perforating punches spaced from each other transversely of the tape.

FIGURES 9 and 10 also illustrate the transverse plate shifting elements 23 and 24 referred to hereinabove in connection with the diagrams of FIGURES 12 to 16 inclusive.

Referring again to the arrangement of the plates to travel in a closed circuit having two oppositely moving runs, and also to the employment of two series of operating mechanisms for filling, briquetting, and sealing, it should be kept in mind that the several operations performed on each of the two tapes being produced are synchronized, so that the operating parts can all be carried by the same press plunger and thus can all be operated by a common mechanism. Moreover, those parts which require not only vertical movement with the press plunger but also those parts which require some movement other than the vertical motion with the press, for instance movement transverse to the direction of the press stroke, are also provided with common mounting arrangements. Thus, as seen in FIGURE 3, the mounting means or oscillating arm 35 described above as carrying the briquetting device 32 serves to carry two of such briquetting devices. Both of these briquetting devices 32 are thus shifted into and out of operative position by oscillation of the shaft 36 under the influence of the pinion 38 and the rack 39.

Similarly, the two retaining rings 29 (see FIGURE 4) require a motion up and down with respect to the platen of the press, but independently of the stroke of the press plunger, and these rings are carried in common by a bracket or mounting structure 47 (see FIGURES 4, 7 and 11) which is carried by a sleeve 48 mounted on the upright shaft 36 and shiftable in a vertical direction by a pivoted shifter lever 49.

The actuation of all of the operating mechanisms including both the longitudinal and the transverse plate shifter elements 21, 22, 23, and 24, the oscillating movement of the briquetting plungers 32, and the vertical movement of the retaining rings 29, are all controlled by cam mechanisms in synchronism with actuation of the press plunger.

In considering these cam synchronizing mechanisms, attention is first directed to the mechanisms for effecting step-by-step shifting of the forming plates in the two runs thereof. For this purpose, as seen in FIGURES 1, 2, and 3, the shifter element 21 is yieldingly connected with a push rod 50 connected with a crank arm 51 projecting from a shaft 52 having a gear 53 meshing with a gear 54 mounted on a shaft 55 which is oscillated by one arm 56 of a bell crank carrying a cam follower 57 engaging a cam 58 carried by the shaft 59 which is driven through gearing 60–61 from the shaft 62 which, in turn, is coupled by means of sprocket and chain drive 63 with a counter shaft 64, in turn driven by sprocket and chain drive 65 from the crank shaft 66 of the press.

The other longitudinal shifting element 22 is yieldingly connected with a rod 67 which, in turn, is connected with an arm 68 of the bell crank which is mounted on shaft 55. Thus, cam 58 serves to actuate both of the longitudinal shifter elements 21 and 22, but because of the gearing 53–54, the motion of these two shifter elements occurs at the same time but in opposite directions.

The transverse shifter elements 23 and 24 are both operated from a cam 69 mounted on the shaft 62 which is driven by the sprocket and chain drive 63. The transverse shifter element 24 is yieldingly connected to a rod 70 which is connected with one arm 71 of a bell crank mounted on shaft 72, such bell crank having another arm 73 carrying a follower 74 riding on the cam 69. The other transverse shifter 23 is yieldingly connected to a rod 75 which is fastened to an arm 76 fixed to a shaft 77, and the two shafts 72 and 77 are provided with gears 78 and 79 which intermesh and thus provide for conjoint but opposite movement of the transverse shifters 23 and 24.

It will be observed in connection with the shifter mechanism that in each case the shifter element itself (21, 22, 23, or 24) is yieldingly connected with the corresponding actuating or push rod; and it will further be observed that the shifting motion of the plates in any direction in the closed circuit is limited in that direction by means of an indexing stop or guide which is carried on the base plate 19a. This arrangement, including the yielding connection of the shifter elements to the actuating mechanism and the employment of yielding stops or guides constitutes an exceedingly simple but accurate system for indexing the position of the plates at the various stations in which the several packaging operations are performed. The pusher element merely advances the plate or plates in a certain direction until the motion is arrested by the indexing guide and then the yielding connection between the pusher element itself and its actuating rod serves to maintain the plate in the exact indexed position. In this way the invention not only provides for highly accurate indexing in a simple manner but the arrangement is of further advantage because the shifter mechanism is used not only for the purpose of shifting the plates from station to station but also for the purpose of accurately indexing the plates in the stations in which the packaging operations are performed. Accurate registry of the over-lying devices, such as the retaining rings 29, the briquetting devices 32, and the heat sealing heads 41, is thus assured, and this is accomplished with respect to the positioning of the plates in both of the runs of the closed circuit.

The oscillating motion of the briquetting devices 32 which are mounted on the oscillating shaft 36 is effected by means of the rack 39 hereinabove mentioned, meshing with gear 38. It may here be noted that the gear 38 has teeth of considerable axial extent so as to maintain intermeshing relation with the rack 39, notwithstanding upward and downward movement of the shaft 36 with the plate 37 which is carried by the press plunger 18. The rack 39 is reciprocated by means of a rod 80 having at its free end a follower 81 riding on a cam 82 carried by the shaft 62.

Finally, the retaining rings 29 and their mounting sleeve 48 are shifted upwardly and downwardly by means of the pivoted arm 49 hereinabove referred to, said arm being extended rearwardly and downwardly and having a follower roller 83 positioned to ride on cam 84.

All of the foregoing cam operating mechanisms are, of course, timed in their operation to the actuation or stroke of the press, because of the driving of the cam shafts 59 and 62 through drive mechanisms from the crank shaft of the press. In addition, the advancement or feed of the tape from the several tape supplies is also timed to the operation of the press, and the delivery of measured charges of coffee to the coffee funnels 30 is similarly timed. The timing of the tape feed and also of the delivery of the coffee charges may be effected by known types of mechanisms synchronously with the other operations, and specific timing mechanisms for tape feed and delivery of coffee charges is not herein illustrated. However, the timing of these operations as well as all of the other operations is diagrammed in FIGURE 17. The figures across the top of this diagram represent degrees in the rotation of the crank shaft 66 and thus correspond to certain positions of the press plunger in its downward and upward strokes. As is above mentioned, the 0° position corresponds to the uppermost position of the ram crank or press plunger, and that position (0°) is indicated at the top left of FIGURE 17.

For the most part, the timing of the various operations will be entirely clear from an examination of FIGURE 17. However, a few points may be noted, as follows: Note that the period of dwell of the heat sealing extends from position corresponding to 135° to position corresponding to 225°. From FIGURE 17 it will also be seen that the tape remains at rest from the 348° position through the 360° or 0° position to the 270° position, and moves between the 270° and 348° positions. The third line of the diagram of FIGURE 17 represents the horizontal or oscillating motion of the briquet plungers, and from here it will be seen the the briquet plungers swing out of their operative positions between the 0° and 115° points in the cycle, these plungers remaining in their positions surrounding the coffee feed nozzles throughout the remainder of the cycle. This is of advantage as it reduces loss and spillage of coffee from the coffee nozzles, the briquetting plungers in effect serving as valve for the coffee delivery nozzles, which valves are only opened between the 0° and 115° points in the cycle.

It is believed that the longitudinal and transverse shifting of the plates will be clear, particularly from comparison of the diagrams of FIGURES 12 and 16 with the diagram of FIGURE 17.

According to the foregoing, a machine is provided of exceedingly simple construction considering the character of the operations performed, and effective and rapid packaging of various materials may be accomplished, it being of especial advantage that the package or tape-forming devices or plates are actively used not only in one run thereof of the closed circuit through which they travel, but in both runs thereof. This is accomplished by arranging the mechanism so as to dispose both runs of the closed circuit in a horizontal plane, so that gravity may be relied upon to hold the material being packaged on top of the forming devices and the tape thereon. Because of the foregoing arrangement of parts, it is also possible to mount various of the operating mechanisms in common on a single press plunger, notwithstanding that various of such parts are cooperating with forming devices or plates which are being advanced step-wise in two opposite directions.

Although the foregoing description refers to the packaging of coffee in pods formed between paper tape strips, it should be understood that the apparatus may be used for the packaging of other materials and may also be employed in connection with packaging material other than paper tape strips, for instance, films of cellulose acetate, woven fabrics, or other materials.

In addition, while the machine illustrated and described herein is arranged to produce a package tape of indefinite length with a series of spaced package pods formed therein, various features of the invention are also applicable to packaging operations where the tap is not produced in continuous form, but in which the individual packages or pods are severed, as by a shear, which may, if desired, be accomplished with the press mechanism used in the performance of the other packaging operations.

I claim:
1. Apparatus for making tape having spaced pockets containing material to be packaged, comprising a plurality of pocket forming devices arranged to travel in a closed circuit having two oppositely moving runs lying generally in the same horizontal plane, each of said devices having an upwardly open cavity for shaping one side of the tape pockets, a separate supply of tape strip for each of said runs arranged to feed the tap strip above and with the forming devices in the direction of movement of said devices in said runs, means for shaping localized areas of the tape strip to the contour of the cavities in the forming device, mechanism for delivering the material to be packaged to the shaped areas of the tape strips in the cavities in said forming devices, a second separate supply of tape strip for each of said runs arranged to feed tape strip above and in the same directions as the other tape strips, and means for sealing the tape strips of the two superimposed pairs to each other in regions surrounding the delivered material to enclose such material in two series of spaced package pockets.

2. Apparatus for making tape having spaced pockets containing material to be packaged, comprising a plurality of tape supporting devices arranged to travel in a closed circuit having two oppositely moving runs lying generally in the same horizontal plane, a separate supply of tape strips for each of said runs arranged to feed tape strip above and in the same directions as said oppositely moving runs, means for delivering charges of material to be packaged to spaced localized zones along the tape strips, a ring member for positioning the materials delivered to the tape strips, the positioning ring being mounted for movement with respect to said means and with respect to the tape between an operating position adapted to retain the delivered material in positions on the tape strips corresponding to the pockets to be formed and another or inoperative position clear of the path of feed of the tape strips and of the delivered materials thereon, and means for sealing the tape strips of the two superimposed pairs to each other in regions surrounding the delivered material to enclose such material in two series of spaced package pockets.

3. Apparatus for packaging material in pockets formed between tape strips, comprising a series of six tape supporting plates all lying in a common plane and mounted for movement in a closed circuit having two oppositely moving runs in each of which two operating stations are provided, each of said plates having an upwardly open cavity for shaping one side of the tape pockets, means for feeding separate tape strips over the plates in said two runs, means for shaping localized areas of the tape strips to the contour of the cavities in said plates, mechanism at one of said stations in each run for delivering material to be packaged to the tape strips, means for feeding second separate tape strips over the plates to which material to be packaged is delivered, and mechanism at the other of said stations in each run for sealing the two strips together around the material to be packaged.

4. Apparatus according to claim 3 in which there are four stations in each run of said closed circuit including the two stations referred to in claim 3 and further including a third station in advance of said two stations and into which the plates are transferred from the opposite run of the closed circuit and a fourth station beyond said two stations and out of which the plates are transferred to the opposite run.

5. Apparatus according to claim 4 and further including mechanism for effecting stepwise shift of the plates through the several stations of each run of said closed circuit of movement.

6. Apparatus according to claim 3 in which the two runs of said closed circuit are extended in a common horizontal plane.

7. Apparatus according to claim 6 and further including feed mechanisms for delivering material to be packaged by gravity to the tape strips fed over the plates at said one station of each run.

8. Apparatus according to claim 3 and further including for said one station of each run of the closed circuit, a briquetting device shiftable into and out of position between the tape strip and the mechanism for feeding material to be packaged to the tape strip.

References Cited by the Examiner
UNITED STATES PATENTS

| | | | |
|---|---|---|---|
| 1,852,924 | 4/32 | Fowler | 53—77 |
| 1,877,233 | 9/32 | Fredsell | 53—77 |
| 2,603,927 | 7/52 | Grey | 53—124 |
| 2,746,223 | 5/56 | Fischer | 53—180 |
| 2,879,635 | 3/59 | Brock | 53—28 |
| 2,916,864 | 12/59 | Meissner | 53—180 |
| 2,958,168 | 11/60 | Vogt | 53—184 XR |
| 3,002,325 | 10/61 | Vogt | 53—184 |
| 3,030,752 | 4/62 | De Woskin | 53—226 |

FRANK E. BAILEY, *Primary Examiner.*
ROBERT A. LEIGHEY, TRAVIS S. McGEHEE,
*Examiners.*